United States Patent Office 3,362,723
Patented Jan. 9, 1968

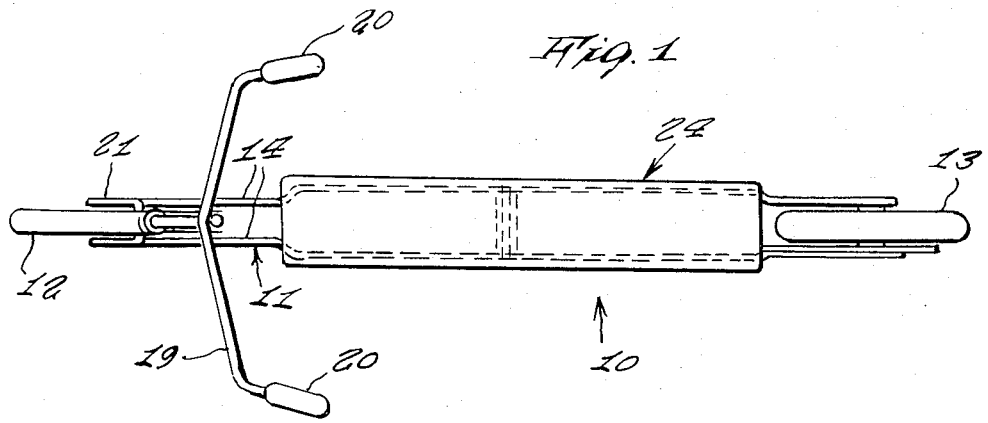
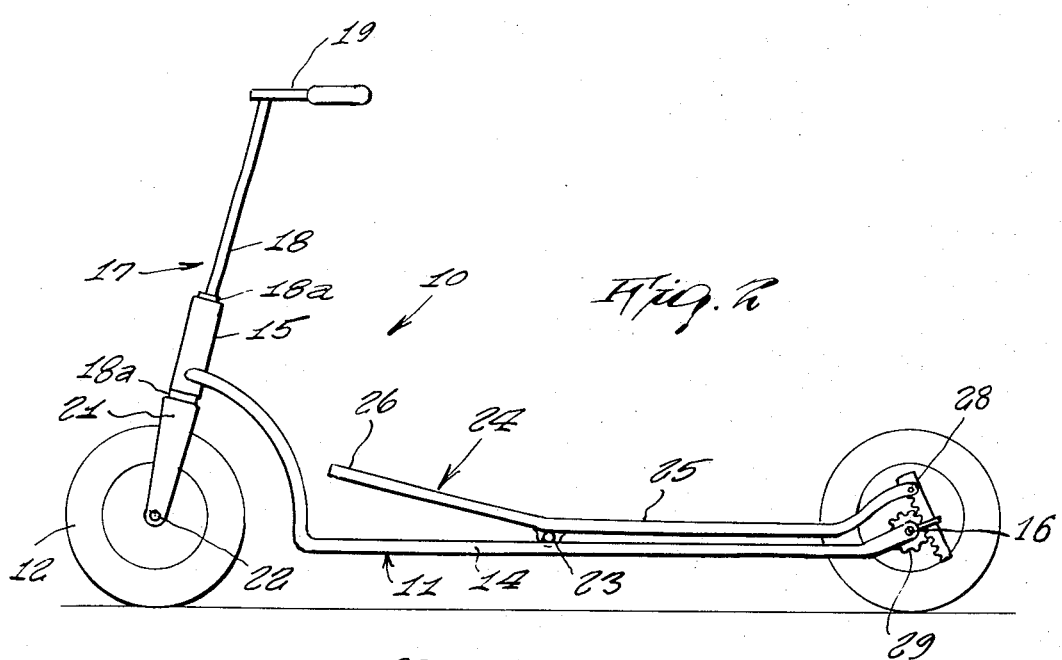
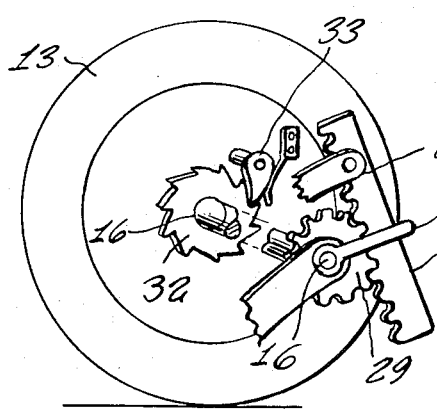

3,362,723
PROPELLED SCOOTER
Kurt Bretholz, 10460 Queens Blvd.,
Flushing, N.Y. 11375
Filed Oct. 23, 1965, Ser. No. 503,607
2 Claims. (Cl. 280—221)

ABSTRACT OF THE DISCLOSURE

A propelled scooter embodying a pair of parallel frame members having at their front ends a steering wheel assembly and mounting at their rear ends a rotatable axle having a gear fixed thereon. To one side of the gear is a wheel rotatable on the axle and between the frame members. A treadle having an upwardly inclined front portion and a curved rear portion concaved downwardly is fulcrumed between its ends on the frame members with the terminal end of the rear portion superposed over the gear. A toothed rack pivoted at its upper end to the terminal end of the treadle rear portion engages the teeth of the gear and is maintained in such engagement by a yoke straddling the rack and pivoted on the axle. Provided on the axle is a ratchet which is engaged by a spring pressed pawl on the wheel. A teetering action of the treadle by the feet of the operator of the scooter will actuate the rack to rotate the gear to drive the rear wheel in a forward direction.

---

This invention relates generally to self-propelled vehicles. More specifically, it relates to scooters having self-powered means.

A principal object of the present invention is to provide a novel self-propelled scooter wherein power for driving the device is obtained from the downward pressure of the rider's foot upon a lever that transfers movement to a drive mechanism.

Another object of the present invention is to provide a propelled scooter wherein raising of the driver's foot from the lever will automatically return the drive mechanism and lever to a starting position ready for a subsequent power stroke as above described.

Other objects are to provide a propelled scooter that is of simple design, relatively inexpensive to manufacture, rugged in construction, easy to use and efficient in operation.

These and other objects will be readily evident upon a study of the following specification and the accompanying drawing wherein:

FIGURE 1 is a top plan view of a propelled scooter embodying the invention,

FIGURE 2 is a side elevation view thereof, and

FIGURE 3 is a fragmentary perspective view of the drive mechanism.

Referring now to the drawing in detail, the numeral 10 represents a propelled scooter according to the present invention wherein there is a stationary frame 11 supported at its front end on a front wheel 12 and at its rear end on a rear wheel 13.

The frame 11 is comprised of a pair of horizontal parallel spaced apart bars 14 which are secured at their front ends to a sleeve 15 and at their rear ends are mounted upon a rear wheel axle 16.

A front wheel assembly 17 is secured pivotally free within the sleeve 15 to permit steering of the scooter, and includes a generally vertical steering post 18 that is fitted through the sleeve 15 of the frame, and secured pivotally free therein by means of collars 18a affixed to the post 18 adjacent the upper and lower ends of the sleeve. A handle bar 19 is formed at the upper end of the post and rubber hand grips 20 are fitted over the terminal ends of the handle bar for providing a comfortable grasp for the drver's hands. The lower end of the steering post incorporates a pair of spaced apart side plates 21 at the lower end of which a front axle 22 is secured therebetween and upon which the front wheel is supported rotatably free.

A cross bar 23 is secured between the bars 14 and a treadle platform 24 is mounted pivotally free thereupon. The treadle platform includes a flat central portion 25, an angularly upwardly turned front portion 26 and a terminal rear end 27 that is pivotally connected to one end of a toothed rack 28.

The rack 28 is in engagement with a gear 29 rigidly affixed to the rear axle 16 supported between the rear ends of bars 14. A yoke 31 also pivoted on the rear axle normally holds the rack in engagement with the gear.

A ratchet wheel 32 is also rigidly secured to the axle 16. The rear wheel 13 is mounted freely on the axle 16, the rear wheel carrying a spring loaded pawl 33 which is in engagement with the ratchet wheel.

In operative use, the rider downwardly depresses the platform at its front end with one foot thus causing the rack 28 to rotate the gear 29 and the rear axle. Thus the ratchet wheel is turned causing the pawl engaged therewith to be also carried along, thus rotating the rear wheel in a forwardly traveling direction. When the platform is fully depressed, the rear wheel continues to rotate while the rear axle, the gear and the ratchet wheel remain at a standstill. By repeating the pumping of the treadle platform with the foot, the rear wheel speed can be increased.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. A propelled scooter comprising a frame composed of a pair of longitudinal, parallel, spaced apart frame bars rigidly connected at their forward ends to a sleeve, an axle rotatably carried by the rear ends of said frame bars, a front steering wheel assembly carried by said sleeve, a rear wheel freely rotatable on said axle disposed between said frame bars, a transverse fulcrum bar secured to said frame bars intermediate the ends thereof, a drive mechanism for the rear wheel, said drive mechanism comprising a treadle platform mounted pivotally free on said fulcrum bar, said platform having a flat horizontal central portion, an upwardly inclined front portion, and a rear end curved portion concaved downwardly in superposed relation to said axle, a gear fixedly secured to said axle, a toothed rack rearwardly of said gear and in engagement therewith, means mounted on said axle and surrounding said rack for maintaining said rack in operative engagement with said gear, pivot means connecting the upper end of said rack to the free terminal end of said platform rear curved portion, a ratchet gear fixedly secured on said axle, and a spring pressed pawl secured to said rear wheel, said pawl being engageable with said ratchet wheel to drive said rear wheel in a forwardly direction only.

2. The combination as set forth in claim 1, wherein said means mounted on the axle comprises a rearwardly extending yoke pivotally mounted on said axle and straddling said toothed rack and wherein said drive mechanism is operated by one foot of the operator being placed upon said upwardly inclined front portion of said platform, and the other foot of said operator being placed upon said flat central portion of said platform, and said operator alternately placing his weight from one foot to the other, thereby activating said drive mechanism.

References Cited
UNITED STATES PATENTS

| | | | |
|---|---|---|---|
| 1,468,346 | 9/1923 | Gedeon et al. | 280—221 |
| 2,723,131 | 11/1955 | McChesney | 280—221 |
| 2,738,981 | 3/1956 | Redeker et al. | 280—254 X |
| 3,006,659 | 10/1961 | Krasnoff et al. | 280—221 |

FOREIGN PATENTS 102,054  12/1923  Switzerland.

KENNETH H. BETTS, *Primary Examiner.*